US012764736B2

(12) United States Patent
Fang et al.

(10) Patent No.: US 12,764,736 B2
(45) Date of Patent: Oct. 13, 2026

(54) COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Yun Fang, Dongguan (CN); Wenhong Chen, Dongguan (CN); Zhihua Shi, Dongguan (CN); Yingpei Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 560 days.

(21) Appl. No.: 17/878,673

(22) Filed: Aug. 1, 2022

(65) Prior Publication Data

US 2022/0386339 A1 Dec. 1, 2022

Related U.S. Application Data

(63) Continuation of application No. PCT/CN2020/081469, filed on Mar. 26, 2020.

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 72/0446* (2013.01); *H04W 72/20* (2023.01)

(58) Field of Classification Search
None
See application file for complete search history.

(56) References Cited

U.S. PATENT DOCUMENTS 11,838,151 B1 * 12/2023 Jones .................. H04L 25/0224
2019/0089489 A1 * 3/2019 Li ........................... H04L 1/189
(Continued)

FOREIGN PATENT DOCUMENTS

CN 110535573 A 12/2019
CN 110535609 A 12/2019
(Continued)

OTHER PUBLICATIONS

International search report and Written Opinion of the International Search Authority with English Translation of PCT/CN2020/081469 mailed Dec. 17, 2020 (15 pages).
(Continued)

*Primary Examiner* — Jutai Kao
(74) *Attorney, Agent, or Firm* — Young Basile Hanlon & MacFarlane, P.C.

(57) ABSTRACT

Embodiments of the present invention provide a communication method, a terminal device, and a network device, which are applicable to the technical field of communications. The method comprises: determining one first control channel from a plurality of control channels which schedule the same data channel; and determining, on the basis of the first control channel, at least one of the following information: a PUCCH resource bearing HARQ feedback information of the data channel, the position of the HARQ feedback information of the data channel in a HARQ codebook, and a resource of the data channel.

12 Claims, 6 Drawing Sheets

(51) Int. Cl.
*H04W 72/0446* (2023.01)
*H04W 72/20* (2023.01)

(56) References Cited

U.S. PATENT DOCUMENTS

| | | | | |
|---|---|---|---|---|
| 2019/0150123 | A1 | 5/2019 | Nogami et al. | |
| 2020/0100219 | A1* | 3/2020 | Takeda | H04W 72/23 |
| 2021/0120557 | A1 | 4/2021 | Takeda et al. | |
| 2021/0345362 | A1* | 11/2021 | Kim | H04L 5/0064 |
| 2022/0278807 | A1* | 9/2022 | Zhang | H04L 1/1887 |

FOREIGN PATENT DOCUMENTS

| | | | |
|---|---|---|---|
| CN | 110731112 | A | 1/2020 |
| CN | 110798894 | A | 2/2020 |
| WO | 2018167959 | A1 | 9/2018 |
| WO | 2018228487 | A1 | 12/2018 |
| WO | 2020042528 | A1 | 3/2020 |

OTHER PUBLICATIONS

Extended European Search Report for EP Application 20927650.0 mailed Dec. 1, 2022. (9 pages).
European First Office Action for European Application No. 20927650.0, issued on Mar. 19, 2025, 8 pages.

* cited by examiner

| First bit | Second bit | Third bit | Fourth bit | Fifth bit | Sixth bit | Seventh bit | Eighth bit |
|---|---|---|---|---|---|---|---|
| HARQ-ACK of PDSCH1 | HARQ-ACK of PDSCH2 | HARQ-ACK of PDSCH3 | NACK | HARQ-ACK of PDSCH5 | HARQ-ACK of PDSCH6 | HARQ-ACK of PDSCH7 | HARQ-ACK of PDSCH8 |

| First bit | Second bit | Third bit | Fourth bit | Fifth bit | Sixth bit | Seventh bit |
|---|---|---|---|---|---|---|
| HARQ-ACK of PDSCH1 | HARQ-ACK of PDSCH2 | HARQ-ACK of PDSCH3 | NACK | HARQ-ACK of PDSCH5 | HARQ-ACK of PDSCH6 | HARQ-ACK of PDSCH7 |

FIG. 4

| First bit | Second bit | Third bit | Fourth bit | Fifth bit | Sixth bit | Seventh bit |
|---|---|---|---|---|---|---|
| HARQ-ACK of PDSCH1 | HARQ-ACK of PDSCH2 | NACK | HARQ-ACK of PDSCH4 | HARQ-ACK of PDSCH5 | HARQ-ACK of PDSCH6 | HARQ-ACK of PDSCH7 |

FIG. 5

COMMUNICATION METHOD, TERMINAL DEVICE AND NETWORK DEVICE

CROSS-REFERENCE TO RELATED APPLICATION(S)

The present application is a continuation-application of International (PCT) Patent Application No. PCT/CN2020/081469, filed on Mar. 26, 2020, the contents of which are hereby incorporated by reference in their entireties.

TECHNICAL FIELD

The present disclosure relates to the field of communication, and in particular to a communication method, a terminal device and a network device.

BACKGROUND

In R16, a physical downlink control channel (PDCCH) does not support repeated transmission. Therefore, the PDCCH is sent from only one transmission node (for example, the PDCCH is sent from only one base station to a terminal device). Usually, one PDCCH schedules a physical downlink shared channel (PDSCH). Therefore, the PDCCH is uniquely determined. When the terminal device selects a physical uplink control channel (PUCCH), the terminal device may decide a PUCCH resource and generate a hybrid automatic repeat re-quest (HARQ) code book based on the uniquely determined PDCCH.

In R17, due to introduction of multiple repeated transmissions of PDCCHs through multiple transmission nodes (for example, transmitted from multiple base stations to the terminal device), multiple PDCCHs may schedule a same PDSCH. Therefore, it may be impossible to determine the PUCCH resources, generate the HARQ code book and determine a resource of a data channel based on the unique control channel, such that selection of the control channel by the network device and selection of the resource for the data channel corresponding to the HARQ code book by the network device may be inconsistent with selection of the control channel by the terminal device and selection of the resource for the data channel corresponding to the HARQ code book by the terminal device. In this way, an uplink control signal sent through the PUCCH may not be demodulated on a correct time-frequency resource, and data that is not successfully transmitted through the PDSCH may not be re-transmitted.

SUMMARY

According to a first aspect, a communication method is provided and includes:

- determining a first control channel from a plurality of control channels scheduling a same data channel; and
- determining, based on the first control channel, at least one of:
- a physical uplink control channel (PUCCH) resource that carries a hybrid automatic repeat request (HARQ) feedback information of the data channel, a location of the HARQ feedback information of the data channel in a HARQ code book, and a resource of the data channel.

In the present embodiment, the terminal device can determine one first control channel from the plurality of control channels scheduling the same data channel, and determine, based on the first control channel, at least one of: a physical uplink control channel (PUCCH) resource that carries a hybrid automatic repeat request (HARQ) feedback information of the data channel, a location of the HARQ feedback information of the data channel in a HARQ code book, and a resource of the data channel. In this way, selection of the control channel by the network device and selection of the resource for the data channel corresponding to the HARQ code book by the network device being inconsistent with selection of the control channel by the terminal device and selection of the resource for the data channel corresponding to the HARQ code book by the terminal device may be avoided. An uplink control signal sent through the PUCCH may be demodulated on a correct time-frequency resource. Data that is not successfully transmitted through the PDSCH may be re-transmitted.

According to a second aspect, a terminal device is provided and includes a processing module, configured to: determine one first control channel from a plurality of control channels scheduling a same data channel; determine, based on the first control channel, at least one of the following: a PUCCH resource carrying HARQ feedback information of the data channel, a location of the HARQ feedback information of the data channel in a HARQ code book, and a resource of the data channel.

According to a third aspect, a network device is provided and includes a processing module, configured to: schedule a same data channel through a plurality of control channels; and

- determine one first control channel from the plurality of control channels, and determine a PUCCH resource carrying HARQ feedback information of the data channel based on the first control channel.

BRIEF DESCRIPTION OF DRAWINGS

FIG. 4 is a second schematic view of a HARQ code book according to an embodiment of the present disclosure.

FIG. 5 is a third schematic view of a HARQ code book according to an embodiment of the present disclosure.

DETAILED DESCRIPTION

Figures 1, 2:
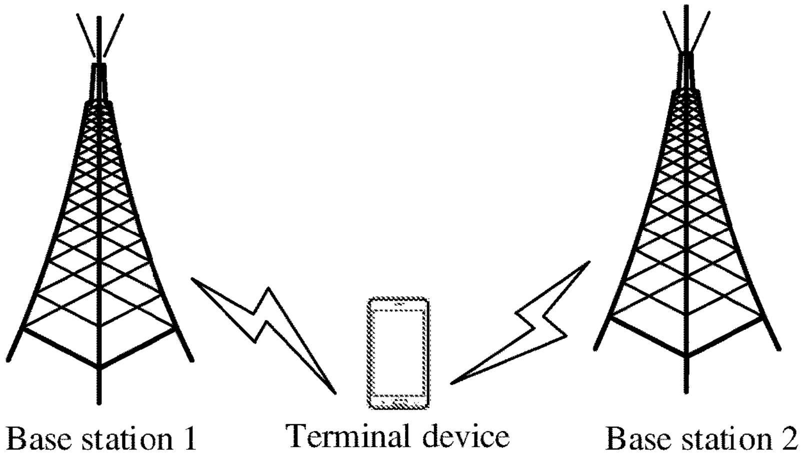
FIG. 1 is a first schematic view of a HARQ code book according to an embodiment of the present disclosure.
FIG. 2 is a schematic view of an architecture of a wireless communication system according to an embodiment of the present disclosure.

Technical solutions of the embodiments of the present disclosure will be described below by referring to the accompanying drawings in the embodiments of the present disclosure. Apparently, the embodiments described are only a part of but not all of the embodiments of the present disclosure. All other embodiments obtained by any ordinary skilled person in the art based on the embodiments in the present disclosure without creative work shall fall within the scope of the present disclosure.

In embodiments of the present disclosure, the expression "exemplary" or "for example" are used to indicate an example, illustration or description. Any embodiment or design described as "exemplary" or "for example" in embodiments of the present disclosure shall not be interpreted as being superior or more advantageous than other embodiments or designs. Specifically, the expression "exemplary" or "for example" are intended to present relevant concepts in a specific manner.

The expression "and/or" herein is used to describe a relationship between associated objects, indicating three relationships. For example, A and/or B may indicate: A alone, both A and B, and B alone. The symbol "/" herein indicates that the associated objects are in an "or" relationship, for example, A/B means A or B.

In the description of the present disclosure, unless otherwise stated, "plurality" means two or more. For example, a plurality of control channels refer to two or more control channels.

The communication method, the terminal device and the network device provided by the present disclosure can be applied to various communication systems, such as a 5G communication system, a future evolution system or a plurality of communication convergence systems, and so on. Various application scenarios may be included, for example, machine-to-machine (M2M), D2M, macro and micro communications, enhanced mobile broadband (eMBB), ultra reliable & low latency communication (uRLLC) and massive machine type communication (mMTC). For example, embodiments of the present disclosure may be applied to scenarios that the PDCCH transmission is performed via multi-transmission reception points (MTRP).

In the related art of embodiments of the present disclosure, the network device is configured for PDCCH transmission by configuring a control resource set (CORESET) and a search space. The CORESET includes a plurality of physical resource blocks in a frequency domain and one to three OFDM symbols in a time domain, and may be located anywhere within a time slot. A time-domain resource occupied by the CORESET may be configured semi-statically by a high-level parameter. The search space is a set of candidate PDCCHs under one or more aggregation levels. An aggregation level of actual PDCCHs sent by the network device may be variable over time. Since there is no relevant signaling to inform the terminal device, the terminal device may blindly check the PDCCHs at various aggregation levels. The PDCCH to be blindly checked may be called a candidate PDCCH. The terminal device may decode all candidate PDCCHs in the search space. In response to a cyclic redundancy check (CRC) validation being passed, decoded PDCCH content may be valid for the terminal device and information obtained from the decoding may be used for subsequent operations.

In NR, in each carrier bandwidth part (BWP) of each service cell, the network device may configure up to 10 search spaces for a user. Time-domain configuration information may be configured in the search spaces to instruct the user to detect a time-domain location of the PDCCH. In addition, a CORESET identity document (CORESET ID) may be configured by the network device for each search space. The user may obtain a physical resource of the search space in the frequency domain via the CORESET ID. Each search space has a unique associated CORESET ID, and different search spaces may be associated with a same CORESET ID. The terminal device may determine a time-frequency domain location of the candidate PDCCH based on the time domain given by the search space, the frequency domain of the associated CORESET ID, and other parameters in the search space.

When the network device is configuring for the CORESET, the network device configures one transmission configuration indicator state (TCI state) or a set of TCI states for each CORESET. The TCI state may be configured to indicate a channel filter coefficient to the user, the channel filter coefficient corresponds to the candidate PDCCH in the search space associated with the CORESET while the candidate PDCCH is being demodulated and detected. When the network device configures a set of TCI states for a CORESET, the network device may activate a unique TCI state for the CORESET through a media access control control element (MAC CE) signaling. The unique TCI state may be configured to indicate the channel filter coefficient of the UE when the UE is demodulating the PDCCH.

In addition, the network device also configures a higher layer index for each CORESET to indicate whether a same TRP is configured. The higher layer index may be specifically a control resource pool index (CORESET pool index), which may take the values of 0 and 1. For CORESETs configured with the same CORESET pool index, the terminal device may determine that the CORESETS are data from the same TRP.

In order to dynamically indicate the PUCCH resource transmitted by the hybrid automatic repeat request (HARQ) feedback, a resource set needs to be defined. In the NR, maximum of 4 resource sets may be supported. Each resource set carries a specific payload. Details about the four sets are described in the following. A range of threshold bits is configured by the network side through the higher layer signaling. The above HARQ feedback may include: HARQ-Affirmative Acknowledgement (HARQ-ACK) and HARQ-Negative Acknowledgement (HARQ-NACK).

For a PUCCH set 1, a threshold is less than or equal to 2, and the PUCCH set 1 may include a maximum of 32 resources.

For a PUCCH set 2, a threshold is greater than 2 and less than or equal to N2, and the PUCCH set 2 may include a maximum of 8 resources.

For a PUCCH set 3, a threshold is greater than N2 and less than or equal to N3, and the PUCCH set 2 may include a maximum of 8 resources.

For a PUCCH set 4, a threshold is greater than N3 and less than or equal to 1706, and the PUCCH set 2 may include a maximum of 8 resources.

Values of N2 and N3 may be configured by the network device.

The terminal device may be restricted by determining the PUCCH set based on the feedback payload and subsequently determining the specific PUCCH resource to be used based on a PUCCH format indicator indicated in the PDCCH.

A maximum number of bits that can be carried in the PUCCH set 1 is 2 bits. For a HARQ-ACK payload range, one PDSCH only needs 1-2 bits, which is the most common case and indicates that one PUCCH corresponds to one PDSCH. Therefore, the maximum number of resources is given in the PUCCH set 1, allowing the maximum configuration of resource utilization and flexibility. When the number of PUCCH resources in the PUCCH set 1 is greater than 8, the terminal device may select a PUCCH resource from the PUCCH set 1 based on the following equation I. The $n_{CCE,P}$ indicates an index corresponding to the first control channel element (CCE) of the PDCCH indicating the PUCCH. The $N_{CCE,P}$ indicates the number of CCEs in the CORESET p corresponding to the PDCCH indicating the PUCCH. The $\Delta_{PRI}$ indicates the PUCCH resource indication in the PDCCH. The $r_{PUCCH}$ identifies the selected PUCCH resource. The $R_{PUCCH}$ is the number of PUCCH resources in the PUCCH set.

$$r_{PUCCH} = \begin{cases} \left\lfloor \frac{n_{CCE,P} \cdot \lceil R_{PUCCH}/8 \rceil}{N_{CCE,P}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,P} \cdot \lfloor R_{PUCCH}/8 \rfloor}{N_{CCE,P}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases} \quad \text{The Equation I}$$

When a plurality of PDCCHs schedule different PDSCHs respectively (one PDCCH schedules one PDSCH), and when PUCCHs that are indicated to carry the HARQ-ACK are transmitting at the same time, resources of the PUCCHs are determined by the last received PDCCH that schedule the PDSCHs. When receiving time points of the PDCCHs are the same, the selected PDCCH is determined based on the serving cell index of the transmitting PDCCH. Related parameters of a PDCCH having a larger serving cell index and instructions for determining PUCCH resources for feedback. When different CORESET pool indexes are configured in one serving cell index and the feedback is set to be joint feedback, in response to the receiving time points of the PDCCHs of different CORESET pool indexes being the same, the PDCCH having the larger CORESET pool index may be selected to determine the PUCCH resource.

When the network device configures a dynamic code book (which may be a HARQ code book) feedback for the terminal device, the terminal device may determine a dynamic codebook for feedback based on a counter downlink allocation index (C-DAI) and a total downlink allocation index (T-DA) configured on the network side. The C-DAI may be determined based on the receiving time point of the PDCCH, the serving cell index and the CORESET pool index corresponding to the CORESET associated with the PDCCH.

Format 1_0 and format 1_1 of downlink control information (DCI) may have the C-DAI. Values of the C-DAI may indicate, until the current service cell and the current PDCCH detection timing, the PDSCH scheduled by the DCI format 1_0 or the DCI format 1_1 or the cumulative number released by semi-persistent scheduling (SPS) indicated by the DCI format 1_0. The cumulative number are counted in the following order: in an ascending order based on the CORESET pool index, then in an ascending order based on the serving cell index, and finally in an ascending order based on a PDCCH detection timing index. As shown in Table 1 below, in a first PDCCH detection time point, for the service cell 1, the service cell 2 and the service cell 3, the C-DAI in the DCI corresponding to each TRP may be 1, 2, 3, 4, 5 respectively. Different TRPs may be feedbacked by different CORESET pool indexes, for example, a CORESET pool 0 in Table 1 and a CORESET pool 1 in Table 1 indicate different TRPs.

In addition, the DCI format 1_1 may be (T-DAI, T-DAI). The T-DAI information may always be present. A value of the T-DAI information may indicate, until the current PDCCH detection timing, the total number received by PDSCHs scheduled by the DCI format 1_0 and the DCI format 1_0 or released by SPS indicated by the DCI format 1_0. T-DAI values of all serving cells at a same PDCCH detection time point may be the same, and the T-DAI may be updated along with the PDCCH detection timing index. As shown in Table 1 below, in a first PDCCH detection time point, T-DAIs in the DCI of all serving cells may be 5. In a second PDCCH detection time point, T-DAIs in the DCI of all serving cells may be 7. In a third PDCCH detection time point, T-DAIs in the DCI of all serving cells may be 8.

TABLE 1

| | | (C-DAI, T-DAI) | | | | | |
|---|---|---|---|---|---|---|---|
| serving | CORESET pool 0 | (1, 5) | PDSCH1 | (6, 7) | PDSCH6 | | |
| cell 0 | CORESET pool 1 | (2, 5) | PDSCH2 | | | | |
| serving | CORESET pool 0 | (3, 5) | PDSCH3 | (6, 7) | PDSCH7 | | |
| cell 1 | CORESET pool 1 | ~~(4, 5)~~ | PDSCH4 | | | (8, 8) | PDSCH8 |
| serving | CORESET pool 0 | (5, 5) | PDSCH5 | | | | |
| cell 2 | CORESET pool 1 | | | | | | |
| | | ←——→ slot | | | | | |
| | | DCI 1_1 | | DCI 1_0 | | | |

Further, the terminal device may generate the dynamic code book based on the obtained C-DAI and T-DAI information.

Exemplarily, the dynamic code book (i.e. HARQ code book) generated by the terminal device based on the C-DAI and T-DAI information in Table 1 may be shown as FIG. 1.

Further, the generated dynamic code book may be sent to the network device via the determined PUCCH resource, and the HARQ feedback may be completed.

In the related art described in the above, when repeated transmission is not supported, the PDCCH transmission is performed from only one transmission node. Usually, one PDCCH may be scheduled through one PDSCH. Therefore, the PDCCH is uniquely determined and the terminal may determine the PUCCH resource and generate dynamic code book based on the uniquely determined PDCCH when selecting the PUCCH.

In R17, due to introduction of multiple repeated transmissions of PDCCHs through multiple transmission nodes (for example, transmitted from multiple base stations to the terminal device), when embodiments of the present disclosure are applied to MTRP transmissions, a plurality of PDCCHs may schedule a same PDSCH. Therefore, it may be impossible to determine the PUCCH resources or to generate the HARQ code book based on the unique PDCCH. In this way, selection of the PDCCH by the network device and selection of the PDSCH corresponding to the dynamic code book by the network device may be inconsistent with selection of the PDCCH by the network device and selection of the PDSCH corresponding to the dynamic code book by the terminal device. Therefore, the uplink control signal sent through the PUCCH may not be demodulated on the correct time-frequency resource, and data that is not successfully transmitted through the PDSCH may not be re-transmitted.

To solve the above technical problem, embodiments of the present disclosure provide a communication determination method, a terminal device and a network device. A unique PDCCH may be determined from a plurality of PDCCHs scheduling the same PDSCH based on a channel determination rule. Selection of the PDCCH by the network device and selection of the PDSCH corresponding to the dynamic code book by the network device being inconsistent with the selection of the PDCCH by the network device and selection of the PDSCH corresponding to the dynamic code book by the terminal device may be avoided. The uplink control signal sent through the PUCCH may be demodulated on the correct time-frequency resource, and data that is not successfully transmitted through the PDSCH may be re-transmitted.

Exemplarily, FIG. 2 is a schematic view of an architecture of a wireless communication system according to an embodiment of the present disclosure. The wireless communication system may support repeated transmission of a plurality of transmission nodes. The wireless communication system may include two network devices (respectively, a base station 1 and a base station 2) and one terminal device, the base station 1 and the base station 2. In the system, data may be transmitted from the base station 1 (equivalent to a transmission node) and the base station 2 (equivalent to another transmission node) to the terminal device. In the system, a plurality of control channel may schedule a same control channel. For this case, according to embodiments of the present disclosure, on one hand, the terminal device may determine a first control channel from the plurality of control channels scheduling the same data channel, and determine, based on the first control channel, at least one of a PUCCH resource carrying the HARQ feedback information of the data channel, a location of the HARQ feedback information of the data channel in the HARQ code book and a resource of the data channel. On the other hand, when the network device schedules the same data channel via the plurality of control channels, the network device may select a first control channel from the plurality of control channels, and determine the PUCCH resource carrying the HARQ feedback information of the data channel based on the first control channel. In this way, selection of the control channel by the network device and selection of the resource for the data channel corresponding to the HARQ code book by the network device being inconsistent with selection of the control channel by the terminal device and selection of the resource for the data channel corresponding to the HARQ code book by the terminal device may be avoided. The uplink control signal sent through the PUCCH may be demodulated on a correct time-frequency resource. Data that is not successfully transmitted through the PDSCH may be re-transmitted.

The terminal device in the embodiments of the present disclosure may be referred to a user equipment (UE). The terminal device may be a personal communication service (PCS) phone, a cordless phone, a session initiation protocol (SIP) phone, a wireless local loop (WLL) station, a personal digital assistant (PDA), and so on. The terminal device may also be a mobile phone, a mobile station (MS), a mobile terminal and a laptop, and so on. The terminal device may be communicated to one or more core networks via a radio access network (RAN). For example, the terminal device may be a mobile phone (or a "cellular" phone) or a computer having the mobile terminal, and so on. For example, the terminal device may be a portable, pocket-sized, handheld, computer-built or vehicle-mounted mobile device that exchanges voice and/or data with a wireless access network. The terminal device may also be a handheld device having wireless communication capabilities, a computing device or other processing devices connected to a wireless modem, an in-vehicle device, a wearable device, a terminal device in future 5G networks or a terminal device in future evolutional networks, and so on. The above shows only examples of the present disclosure, and practical applications may not be limited thereto.

The network device in the embodiments of the present disclosure may be an LTE system, a NR communication system or an evolutional node B (eNB or e-NodeB) in an authorized auxiliary access long-term evolution (LAA-LTE) system. A macro base station, a micro base station, an access point (AP), a transmission point (TP) or a new generation Node B (gNodeB), and so on. The above-mentioned network device may also be other types of network devices in the future 5G communication system or future evolutional networks.

Figure 3:
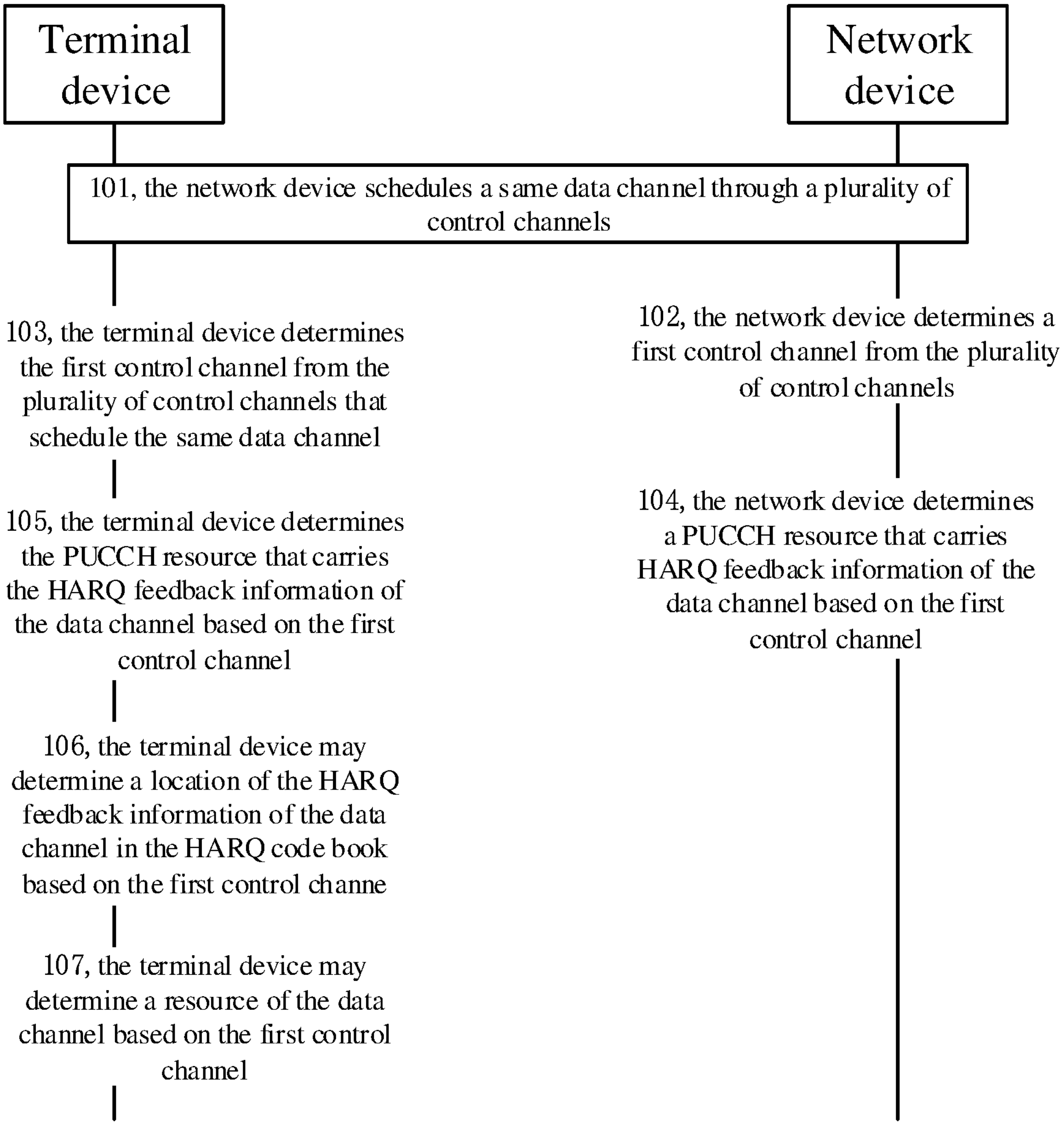
FIG. 3 is a first flow chart of a communication method according to an embodiment of the present disclosure.

As shown in FIG. 3, a communication determination method is provided according to embodiments of the present disclosure. The method may include following operations.

In an operation 101, the network device schedules a same data channel through a plurality of control channels.

Alternatively, the above control channel may be a downlink control channel, such as a PDCCH.

Alternatively, the above data channel may be a downlink data channel, such as a PDSCH. The above data channel may also be an uplink data channel, such as a physical uplink shared channel (PUSCH).

In an operation 102, the network device determines a first control channel from the plurality of control channels.

Alternatively, the first control channel may include the following four cases.

In a case 1, one control channel may be designated from the plurality of control channels.

Alternatively, the network device may directly designate one control channel from the plurality of control channels as the first control channel. Accordingly, the network device may indicate the designated control channel to the terminal device.

In a case 2, one control channel is designated from all control channels associated with a first identifier in the plurality of control channels.

Alternatively, the network device may designate one control channel directly as the first control channel from all the control channels that are associated with the first identifier and are in the plurality of control channels. Accordingly, the network device may indicate the designated control channel to the terminal device. Accordingly, the network device may indicate the designated control channel to the terminal device.

Alternatively, the first identifier may include: a largest identifier of all identifiers associated with the plurality of control channels, or a smallest identifier of all identifiers associated with the plurality of control channels.

Exemplarily, when the identifiers associated with the plurality of control channels are search space identifiers. the first control channel may be a control channel having a largest search space identifier from the plurality of control channels.

To be noted that, the above first identifier may be any one of the identifiers associated with the plurality of control channels. That is, besides the largest/smallest identifier of all identifiers associated with the plurality of control channels, the above first identifier may further be a second largest/smallest identifier of all identifiers associated with the plurality of control channels. Which one of the identifiers associated with the plurality of control channels set to be the first identifier may be determined based on actual demands, and will not be limited by the present application.

In a case 3, the first control channel may be the k-th control channel in an ordering result.

A candidate control channel may be any of the plurality of control channels described above. Alternatively, the candidate control channel may be all of the control channels associated with the first identifier in the plurality of control channels.

The k is an integer greater than or equal to 1.

Alternatively, the kth control channel may include: the first control channel or a last control channel.

The ordering result may be obtained by placing candidate control channels in an order based on detection time points of the candidate control channels.

Alternatively, when m control channels of all candidate control channels have a same detection time point, an order of the m control channels in the ordering result may be obtained by placing the m control channels in an order based on a second identifier associated with the m control channels. The m may be an integer greater than or equal to 2.

The detection time point may be referred to as a detection timing or a receiving time point in the frequency domain.

Alternatively, when n control channels of the m control channels correspond to a same second identifier, an order of the n control channels in the ordering result may be obtained by placing the n control channels in an order based on a third identifier associated with the n control channels. The n may be an integer greater than or equal to 2.

To be noted that, in addition to taking the detection time point, the second identifier and the third identifier to place the candidate control channels in an order, more parameters may be taken to place the candidate control channels in an order, as long as each control channel of all candidate control channels has a unique sequential position. The present invention does not limit the parameter for placing the control channels in an order.

In a case 4, the first control channel may be a control channel, which is one of the candidate control channels and occupies a frequency-domain resource location of a specified size.

The candidate control channels may be the plurality of control channels as described above. Alternatively, the candidate control channels may be all of the control channels associated with the first identifier in the plurality of control channels as described above.

Alternatively, the control channel occupying the frequency-domain resource location of the specified size may include:

One of the candidate control channels that occupies a smallest frequency-domain resource location, or one of the candidate control channels that occupies a largest frequency-domain resource location.

To be noted that, the above control channel occupying the frequency-domain resource location of the specified size may be any one of the candidate control channels. That is, in addition to the above first identifier being the control channel of the candidate control channels occupying the smallest/largest frequency-domain resource location, the control channel occupying the frequency-domain resource location of the specified size may also be a control channel of the candidate control channels occupying the second smallest/largest frequency-domain resource location. It may be determined, based on actual demands, which one of the candidate control channels is the control channel occupying the frequency-domain resource location of the specified size. The present disclosure does not limit determination of the control channel occupying the frequency-domain resource location of the specified size.

For the network device, the first identifier, the second identifier, and the third identifier as described above may be determined by one of the following ways a and b.

In a way a, the identifier may be predetermined in the standard protocol.

In the embodiment of the present disclosure, the above-mentioned first identifier, the second identifier and the third identifier may be predefined in a communication standard protocol. In this way, both the network device and the terminal device may determine a control channel predetermined by the standard as the first control channel.

In a way b, the identifier may be configured by the network device.

Alternatively, in embodiments of the present disclosure, the above-mentioned designated control channel and the k may also be determined by the way a and the way b.

In embodiments of the present disclosure, the network device may determine the first identifier, the second identifier and the third identifier. Accordingly, the network device may indicate the determined first identifier, the second identifier and the third identifier to the terminal device, such that the network device and the terminal device may determine a same control channel as the first control channel.

In embodiments of the present disclosure, a type of identifiers associated with the plurality of control channels may include one of the following:

Type 1: a CORESET pool index.

Type 2: CORESET ID.

Type 3: TCI state identifier, i.e., TCI state ID.

Type 4: search space identifier, i.e., search space ID.

Type 5: first control channel element index, i.e., first CCE index.

Alternatively, the identifier associated with the plurality of control channels may be the first identifier, the second identifier or the third identifier as described above.

Alternatively, in the embodiment of the present disclosure, the second identifier and the third identifier may be in different types of the five types as described above.

For the network device, the identifiers (which may include the first identifier, the second identifier, and the third identifier) associated with the plurality of control channels may be indicated to the terminal device by one of the following ways.

In a way 1, the identifier may be dynamically indicated by the network device.

In a way 2, the identifier may be semi-statically indicated by the network device.

In a way 3, the identifier may be statically indicated by the network device.

In an operation 103, the terminal device determines the first control channel from the plurality of control channels that schedule the same data channel.

The first control channel determined by the network device and the first control channel determined by the terminal device may be the same one of the plurality of control channels.

In embodiments of the present disclosure, for the terminal device, the first control channel determined by the terminal device may further include the first case, the second case, the third case and the fourth case as described above, and may refer to description of the operation 102.

Alternatively, for the terminal device, the first identifier, the second identifier, and the third identifier may be determined by one of the following ways.

In a way a, the identifier may be predetermined based on a standard.

In a way c, the identifier may be dynamically indicated by the network device.

In a way d, the identifier may be semi-statically indicated by the network device.

In a way e, the identifier may be statically indicated by the network device.

In an operation 104, the network device determines a PUCCH resource that carries HARQ feedback information of the data channel based on the first control channel.

The HARQ feedback information may include a HARQ-ACK or a HARQ-NACK.

In an operation 105, the terminal device determines the PUCCH resource that carries the HARQ feedback information of the data channel based on the first control channel.

Exemplarily, in table 2, both PDCCH1-1 and PDCCH1-2 schedule PDSCH1, and both PDCCH 2-1 and PDCCH2-2 schedule PDSCH2. Transmission through the PDCCH 1-1 and the PDCCH 1-2 are performed via different TCI state IDs, and transmission through the PDCCH 2-2 and the PDCCH 2-2 are performed via different TCI state IDs. The terminal device may detect the PDCCH1-1 and determine time-domain resources (i.e. feedback time slots) for the PDSCH1 and the PUCCH1. The terminal device may detect the PDCCH2-2 and determine a PDSCH2 and a PDCCH2. The PDCCH1 and the PDCCH2 may indicate that feedback is provided via the PUCCH at a same slot. The terminal device may determine a location of a most recent transmission of the PDCCH1 and the PDCCH2. The most recent transmission (i.e. the most recent detection time point) of the PDCCH1 may be the PDCCH1-2, and the most recent transmission of the PDCCH2 may be the PDCCH2-2. Further, the terminal device may place PDCCHs that schedule various PDSCHs in an order by time. The most recently transmitted PDCCH (i.e. the PDCCH1-2 in Table 2) may be selected as a reference PDCCH, and the PUCCH resource carrying the HARQ feedback information may be determined based on the PDCCH1-2.

TABLE 2

| | [illegible] | | | | | | |
|---|---|---|---|---|---|---|---|
| [illegible] | T1 | T2 | T3 | T4 | T5 | T6 | T7 |
| F1 | PDCCH-1 | | | | PDSCH-1 | | |
| F2 | | | PDCCH2-2 | | | | PUCCH1&PUCO-12 |
| F3 | | PDCCH2-1 | | PDCCH1-2 | | | |
| F4 | | | | | | PDSCH-2 | |
| F5 | | | | | | | |
| F6 | | | | | | | |

To be noted that the resource mentioned in embodiments of the present disclosure may be understood as a time-domain resource and/or a frequency-domain resource. For example, the PUCCH resource may be a PUCCH time-domain resource and/or a PUCCH frequency-domain resource.

Alternatively, in embodiments of the present disclosure, at least one of the operations 105,106 and 107 may be performed.

Alternatively, the network device may send a first resource indication message to the terminal device when scheduling the data channel through the plurality of control channels. Accordingly, the terminal device may receive the first resource indication message. The first resource indication message may include: a time slot offset of data, which is indicated in the plurality of control channels, to the PUCCH resource, and a resource indication of the PUCCH.

Further, the terminal device may determine a feedback time slot of the PUCCH based on the resource of the data channel and the time slot offset of data, which is indicated in the plurality of control channels, to the PUCCH resource. Further, the terminal device may determine the PUCCH resource based on the resource indication of the PUCCH and the feedback time slot of the PUCCH.

In the following example, the control channel may be the PDCCH, and the data channel may be the PDSCH. By referring to the table, the method of determining the PUCCH resource carrying the HARQ feedback information of the data channel based on the first control channel will be exemplarily described.

Exemplarily, in table 3, a PDCCH1-1 to a PDCCH1-4 all schedule the PDSCH1. The terminal device may detect the PDCCH1-2 and determine the PDSCH scheduled by PDCCH and a time-domain resource (i.e., the feedback time slot) of a corresponding PUCCH. Only the PDSCH1 scheduled by the PDCCH1-1 to the PDCCH1-4 may be fed back through the PUCCH in an indicated slot. The terminal device may determine the PDCCH of the most recent transmission as the PDCCH1-4 based on the detected PDCCH1-2. The terminal device may take the PDCCH1-4 as a reference PDCCH to determine the PUCCH resource that carries the HARQ feedback information of the PDSCH1.

TABLE 3

| | [illegible] | | | | | |
|---|---|---|---|---|---|---|
| [illegible] | T1 | T2 | T3 | T4 | T5 | T6 |
| F1 | PDCCH1-1 | | | | | |
| F2 | | | PDCCH1-3 | | PDSCH1 | PUCCH1 |
| F3 | | PDCCH1-2 | | PDCCH1-4 | | |
| F4 | | | | | | |
| F5 | | | | | | |
| F6 | | | | | | |

Exemplarily, in table 4, the PDCCH 1-1 to the PDCCH 1-4 all schedule the PDSCH1. PDCCH 1-1 transmission and the PDCCH 1-3 transmission are performed via a TCI state ID 0, and PDCCH 1-2 transmission and PDCCH 1-4 transmission are performed via a TCI state ID 1. The terminal may detect the PDCCH 1-2 and determine the PDSCH scheduled by the PDCCH and the corresponding PUCCH. Only the PDSCH 1 scheduled by the PDCCH 1-1 to the PDCCH 1-4 is fed back through the PUCCH in the indicated slot. The terminal device may determine the PDCCH of the most recently transmission via the minimum TCI state ID (i.e., the TCI state ID 0) as the PDCCH 1-3 based on the detected PDCCH 1-2. The terminal may determine the PUCCH resource that carries the HARQ feedback information of the PDSCH based on the PDCCH 1-3.

TABLE 4

| | [illegible] | | | | | |
|---|---|---|---|---|---|---|
| [illegible] | T1 | T2 | T3 | T4 | T5 | T6 |
| F1 | PDCCH1- | | | | | |
| F2 | 1 | | PDCCH1- | | PDSCH1 | PUCCH1 |
| F3 | | PDCCH1- | 3 | PDCCH1- | | |
| F4 | | 2 | | 4 | | |
| F5 | | | | | | |
| F6 | | | | | | |

In table 5, both the PDCCH1-1 and the PDCCH1-2 schedule the PDSCH1, and both the PDCCH 2-1 and the PDCCH2-2 schedule the PDSCH2. PDCCH 1-1 transmission and 1-2 transmission are performed via different TCI state IDs. PDCCH2-2 transmission and PDCCH2-2 transmission are performed via different TCI state IDs. The terminal device may detect the PDCCH 1-1, and determine the PDSCH1 and the PUCCH1. The terminal device may detect the PDCCH2-2 and determine the PDSCH2 and the PDCCH2. The PDCCH1 and the PDCCH2 indicate feedback via the PUCCH at a same slot. The terminal device may determine a location of the most recent transmission of the PDCCH1 and the PDCCH2 by the network device. The terminal device may determine the most recent transmission of the PDCCH1 as the PDCCH1-2 and the most recent transmission of the PDCCH2 as the PDCCH2-2. The PDCCH1 may correspond to a serving cell id 0, and the PDCCH2 may correspond to a serving cell id 1. Therefore, the PDCCH2-2 may be selected to determine the PUCCH resource that carries the HARQ feedback information.

TABLE 5

| frequency | Time domain | | | |
|---|---|---|---|---|
| domain | T1 | T2 | T3 | T4 |
| F1 | PDCCH1-1 | PDCCH1-2 | | |
| F2 | | | PDSCH1 | PUCCH1&PUCCH2 |
| F3 | | | | |
| F4 | | | | |
| F5 | | | | |
| F6 | PDCCH2-1 | | | |
| F7 | | | PDSCH2 | |
| F8 | | PDCCH2-2 | | |
| F9 | | | | |
| F10 | | | | |
| F11 | | | | |

In an operation 106, the terminal device may determine a location of the HARQ feedback information of the data channel in the HARQ code book based on the first control channel.

Alternatively, the terminal device may determine the C-DAI of the data channel and the T-DAI of the data channel based on the first control channel, and determine the location of the HARQ feedback information of the data channel in the HARQ code book based on the C-DAI of the data channel and the T-DAI of the data channel.

The operation of the terminal device determining the location of the HARQ feedback information of the data channel in the HARQ code book based on the first control channel will be exemplarily described by referring to tables.

Exemplarily, in table 6, the PDCCH1 may schedule the PDSCH1 through a plurality of transmissions (the PDCCH1-1, the PDCCH 1-2, and the PDCCH 1-3), and the PDCCH2 to the PDCCH7 may schedule the PDSCH2 to the PDSCH7, respectively. The transmission in the PDCCH1 may be repeated through a same TRP or through a plurality of TRPs (In Table 6, different TRPs may be represented by different CORESET pool indexes, a CORESET pool 0 may represent TRP0, and a CORESET pool 1 may represent TRP1). The network device may correspond the PDCCH to the PDSCH1 based on an earliest PDCCH (the PDCCH 1-1 in Table 6) transmission of the plurality of transmissions of the PDCCH. The network device may generate the C-DAI and the T-DAI based on the PDCCH1-1 and other PDCCHs of a same detection time point. Accordingly, the terminal device may determine the PDCCH1-1 to be the reference PDCCH based on a first way of the above channel determination rules. The terminal device may generate the C-DAI and the T-DAI based on the PDCCH1-1 and other PDCCHs of the same detection time point, and determine the C-DAI and the T-DAI of the PDSCH1. Further, the terminal device may determine the location of the HARQ feedback information in the HARQ code book based on the obtained C-DAI and T-DAI of the PDSCH1.

TABLE 6

| | | | | | | | | | |
|---|---|---|---|---|---|---|---|---|---|
| | | (C-DAI, T-DAI) | | | | | | | |
| serving | CORESET | PDCCH1-1 | PDCCH1-2 | PDCCH1-3 | | PDCCH5 | | | |
| cell 0 | pool 0 | (1, 4) | (1, 4) | (1, 4) | PDSCH1 | (5, 6) | PDSCH5 | | |
| | CORESET | PDCCH2 | | | | | | | |
| | pool 1 | (2, 4) | | | PDSCH2 | | | | |
| serving | CORESET | PDCCH3 | | | | PDCCH6 | | | |
| cell 1 | pool 0 | (3, 4) | | | PDSCH3 | (6, 6) | PDSCH6 | | |
| | CORESET | PDCCH4 | | | | | | PDCCH7 | |
| | pool 1 | [illegible] | | | PDSCH4 | | | (7, 7) | PDSCH7 |
| | | DCH-1 | | DCH-0 | | | | | |

Exemplarily, the terminal device may determine the location of the HARQ feedback information of the data channel in the HARQ code book based on each C-DAI and each T-DAI in Table 6, and the generated HARQ code book may be shown in FIG. 4.

Exemplarily, in table 7, the PDCCH1 may schedule the PDSCH1 through a plurality of transmissions (the PDCCH1-1, the PDCCH 1-2, and the PDCCH 1-3). The PDCCH2 to the PDCCH7 may schedule the PDSCH2 to the PDSCH7, respectively. The repeated transmission in the PDCCH1 may be performed through a same TRP or through a plurality of TRPs. The network device may correspond the PDCCH to the PDSCH1 based on a last PDCCH (the PDCCH 1-3 in Table 7) transmission of the plurality of transmissions of the PDCCH. The network device may generate the C-DAI and the T-DAI based on the PDCCH1-3 and other PDCCHs of a same detection time point. Accordingly, the terminal device may determine the PDCCH1-1 to be the reference PDCCH based on a first way of the above channel determination rules. The terminal device may determine the C-DAI and the T-DAI of the PDSCH1 based on the PDCCH 1-3 and other PDCCHs at the same detection time point. Further, the terminal device may determine the location of the HARQ feedback information in the HARQ code book based on the obtained C-DAI and T-DAI of the PDSCH1.

network device may select one first control channel from the plurality of control channels, and determine the PUCCH resource carrying the HARQ feedback information of the data channel based on the first control channel. In this way, selection of the control channel by the network device and selection of the resource for the data channel corresponding to the HARQ code book by the network device being inconsistent with selection of the control channel by the terminal device and selection of the resource for the data channel corresponding to the HARQ code book by the terminal device may be avoided. The uplink control signal sent through the PUCCH may be demodulated on a correct time-frequency resource. Data that is not successfully transmitted through the PDSCH may be re-transmitted.

Figure 6:
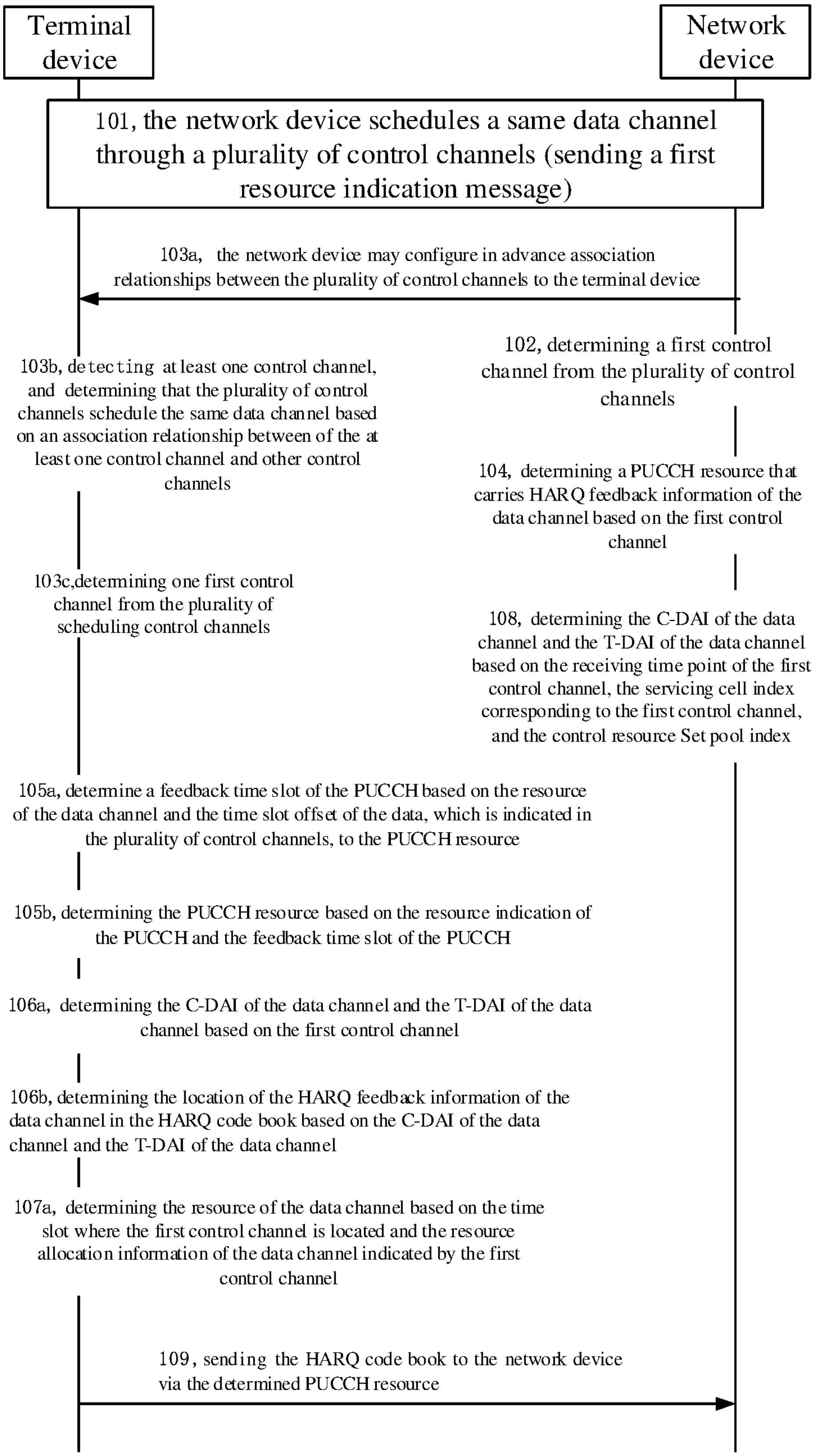
FIG. 6 is a second flow chart of a communication method according to an embodiment of the present disclosure.

Further, as shown in FIG. 3 and FIG. 6, in the communication method of the embodiments of the present disclosure, before the operation 103 in FIG. 3, the communication method according to the embodiments of the present disclosure may further include following operations.

In an operation 103*a*, the network device may configure in advance association relationships between the plurality of control channels to the terminal device.

The association relationships between the plurality of control channels may be configured to indicate that the plurality of control channels schedule the same data channel.

TABLE 7

| | | (C-DAI, T-DAI) | | | | | | | |
|---|---|---|---|---|---|---|---|---|---|
| serving cell 0 | CORESET pool 0 | PDCCH1-1 (4, 4) | PDCCH1-2 (4, 4) | PDCCH1-3 (4, 4) | PDSCH1 | PDCCH5 (5, 6) | PDSCH5 | | |
| | CORESET pool 1 | PDCCH2 (1, 3) | | | PDSCH2 | | | | |
| serving cell 1 | CORESET pool 0 | PDCCH3 (2, 3) | | | PDSCH3 | PDCCH6 (6, 6) | PDSCH6 | | |
| | CORESET pool 1 | PDCCH4 ~~(3, 5)~~ | | | PDSCH4 | | | PDCCH7 (7, 7) | PDSCH7 |
| | | DCH-1 | | DCH-0 | | | | | |

Exemplarily, the terminal device may determine the location of the HARQ feedback information of the data channel in the HARQ code book based on each C-DAI and each T-DAI in Table 7, and the generated HARQ code book may be shown in FIG. 4.

In an operation 107, the terminal device may determine a resource of the data channel based on the first control channel.

Alternatively, the terminal device may determine the resource of the data channel based on a time slot where the first control channel is located and resource allocation information of the data channel indicated by the first control channel.

Alternatively, the resource allocation information may be a time slot occupied by the data channel. Alternatively, the resource allocation information may be the time slot occupied by the data channel and bits occupied by the data channel in the time slot.

In the present embodiment, on one hand, the terminal device may determine the first control channel from the plurality of control channels scheduling the same data channel, and determine, based on that first control channel, at least one of the PUCCH resource carrying the HARQ feedback information of the data channel, the location of the HARQ feedback information of the data channel in the HARQ code book, and the resource of the data channel. On the other hand, when the network device schedules the same data channel via the plurality of control channels, the network device may configure in advance the association Accordingly, the terminal device may be informed of the association relationships between the control channels based on the in-advance configuration made by the network device.

Alternatively, the operation 103 in FIG. 3 above may be replaced with an operation 103*b* and an operation 103*c* as follows.

In an operation 103*b*, at least one control channel may be detected, and it may be determined that the plurality of control channels schedule the same data channel based on an association relationship between of the at least one control channel and other control channels.

The plurality of control channels may include: the at least one control channel and other control channels scheduling the same data channel as the at least one control channel.

In an operation 103*c*, the first control channel may be determined from the plurality of scheduling control channels.

According to the embodiments of the present disclosure, the at least one control channel may be detected to confirm whether there are other control channels scheduling the same data channel as the at least one control channel. When it is determined that there are a plurality of control channels scheduling the same control channel, the first control channel may be determined from the plurality of control channels.

According to the embodiments of the present disclosure, the network device may configure in advance the association relationships between the plurality of control channels scheduling the same data channel to the terminal device, such that the terminal device may determine other control channels by detecting the at least one control channel and based on the association relationships, but does not need to detect each control channel. In this way, when it is determined that a plurality of control channels schedule the same data channel, the first control channel may be selected from the plurality of control channels to be the reference. The terminal device may determine at least one of: the PUCCH resource carrying the HARQ feedback information of the data channel, the location of the HARQ feedback information of the data channel in the HARQ code book, and the resource of the data channel. In this way, the power consumption caused by the terminal device detecting the control channel may be reduced.

Alternatively, as shown in FIG. 6, in the operation 101, the network device may send a first resource indication message to the terminal device when scheduling the data channel through the plurality of control channels. Accordingly, the terminal device may receive the first resource indication message.

Alternatively, the operation 105 in FIG. 3 may be replaced with an operation 105*a* and an operation 105*b* in FIG. 6.

The first resource indication message may include: the time slot offset of the data, which is indicated in the plurality of control channels, to the PUCCH resource, and the resource indication of the PUCCH.

In an operation 105*a*, the terminal device may determine a feedback time slot of the PUCCH based on the resource of the data channel and the time slot offset of the data, which is indicated in the plurality of control channels, to the PUCCH resource.

In an operation 105*b*, the terminal device may determine the PUCCH resource based on the resource indication of the PUCCH and the feedback time slot of the PUCCH.

Alternatively, the operation 106 in FIG. 3 may be replaced with an operation 106 a and an operation 106*b* in FIG. 6.

In an operation 106*a*, the terminal device may determine the C-DAI of the data channel and the T-DAI of the data channel based on the first control channel.

In an operation 106*b*, the terminal device may determine the location of the HARQ feedback information of the data channel in the HARQ code book based on the C-DAI of the data channel and the T-DAI of the data channel.

Alternatively, the operation 107 in FIG. 3 may be replaced with an operation 107*a* in FIG. 6.

In an operation 107*a*, the terminal device may determine the resource of the data channel based on the time slot where the first control channel is located and the resource allocation information of the data channel indicated by the first control channel.

In embodiments of the present disclosure, after the operation 104, an operation 108 may be performed.

In an operation 108, the network device may determine the C-DAI of the data channel and the T-DAI of the data channel based on the receiving time point of the first control channel, the servicing cell index corresponding to the first control channel, and the control resource set pool index.

After the operation 105*c*, the operation 106*b* and the operation 107*a*, embodiments of the present disclosure may further include an operation 109.

In an operation 109, the terminal device may send the HARQ code book to the network device via the determined PUCCH resource.

According to the embodiments of the present disclosure, on one hand, the terminal device may determine the first control channel from the plurality of control channels scheduling the same data channel, and determine, based on the first control channel, at least one of the PUCCH resource carrying the HARQ feedback information of the data channel, the location of the HARQ feedback information of the data channel in the HARQ code book, and the resource of the data channel. On the other hand, when the network device schedules the same data channel via the plurality of control channels, the network device may select the first control channel from the plurality of control channels, and determine the PUCCH resource carrying the HARQ feedback information of the data channel based on the first control channel. In this way, selection of the control channel by the network device and selection of the resource for the data channel corresponding to the HARQ code book by the network device being inconsistent with selection of the control channel by the terminal device and selection of the resource for the data channel corresponding to the HARQ code book by the terminal device may be avoided. An uplink control signal sent through the PUCCH may be demodulated on a correct time-frequency resource. Data that is not successfully transmitted through the PDSCH may be re-transmitted.

Further, after the terminal device determines the PUCCH resource that carries the HARQ feedback information of the data channel, the location of the HARQ feedback information for the data channel in the HARQ code book and the resource of the data channel, the terminal device may send the HARQ code book to the network device based on the determined PUCCH resource. In this way, selection of the control channel by the network device and selection of the resource for the data channel corresponding to the HARQ code book by the network device may be consistent with selection of the control channel by the terminal device and selection of the resource for the data channel corresponding to the HARQ code book by the terminal device. Therefore, the uplink control signal sent through the PUCCH may be demodulated on a correct time-frequency resource, and data that is not successfully transmitted through the PDSCH may be re-transmitted.

Figure 7:
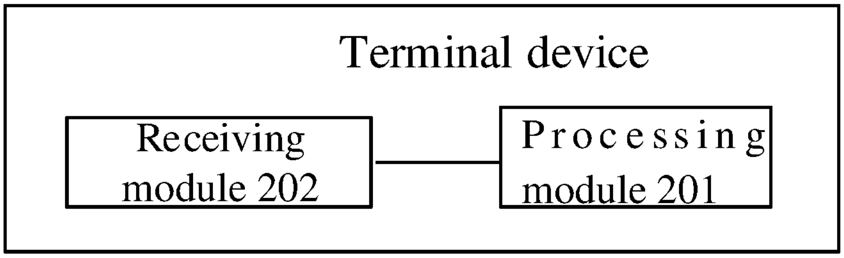
FIG. 7 is a structural schematic view of a terminal device according to an embodiment of the present disclosure.

As shown in FIG. 7, embodiments of the present disclosure provide a terminal device including following components.

A processing module 201 may be configured to determine a first control channel from a plurality of control channels scheduling the same data channel.

The processing module 201 may be configured to determine, based on the first control channel, at least one of the following:

- the PUCCH resource carrying the HARQ feedback information of the data channel, the location of the HARQ feedback information of the data channel in the HARQ code book, and the resource of the data channel.

Alternatively, the association relationships between the plurality of control channels may be in advance configured by the network device, and the association relationships between the plurality of control channels may be configured to indicate that the plurality of control channels schedule the same data channel.

Alternatively, the processing module 201 may further be configured to detect at least one control channel and determine a plurality of control channels based on the association relationships between the at least one control channel and other control channels.

The plurality of control channels may include: at least one control channel and other control channels scheduling the same data channel as the at least one control channel.

Alternatively, the first control channel may be a control channel of the plurality of control channels and designated from all control channels associated with the first identifier.

Alternatively, the first identifier may include: the largest identifier of all identifiers associated with the plurality of control channels or the smallest identifier of all identifiers associated with the plurality of control channels.

Alternatively, the first control channel may be the k-th control channel in an ordering result. The ordering result may be obtained by placing the candidate control channels based on the detection time points of the candidate control channels. The k may be an integer greater than or equal to 1.

The candidate control channels may be a plurality of control channels. Alternatively, the candidate control channels may be all control channels, which are associated with the first identifier and are part of the plurality of control channels.

Alternatively, the k-th control channel may include:

a first one of the control channels or the last one of the control channels.

Alternatively, when m control channels of all candidate control channels have a same detection time point, an order of the m control channels in the ordering result may be obtained by placing the m control channels in an order based on a second identifier associated with the m control channels. The m may be an integer greater than or equal to 2.

Alternatively, when n control channels of the m control channels correspond to a same second identifier, an order of the n control channels in the ordering result may be obtained by placing the n control channels in an order based on a third identifier associated with the n control channels. The n may be an integer greater than or equal to 2.

Alternatively, the first control channel may be a control channel, which is one of the candidate control channels and occupies a frequency-domain resource location of a specified size.

The candidate control channels may be a plurality of control channels. Alternatively, the candidate control channels may be all control channels, which are associated with the first identifier and are a part of the plurality of control channels.

Alternatively, the control channel occupying the frequency-domain resource location of the specified size may include following:

One of the candidate control channels that occupies a smallest frequency-domain resource location, or one of the candidate control channels that occupies a largest frequency-domain resource location.

Alternatively, the first identifier, the second identifier, and the third identifier may be determined by one of the following ways:

predetermined based on a standard; dynamically indicated by the network device; semi-statically indicated by the network device; and statically indicated by the network device.

Alternatively, identifiers associated with the plurality of control channels may include:

at least one of the CORESET pool index; the CORESET ID; the TCI state ID; the search space ID; and the first CCE index.

Alternatively, the processing module 201 may be configured to determine the C-DAI of the data channel and the T-DAI of the data channel based on the first control channel.

The processing module 201 may be configured to determine the location of the HARQ feedback information of the data channel in the HARQ code book based on the C-DAI of the data channel and the T-DAI of the data channel.

Alternatively, the terminal device may further include following components.

A receiving module 202 may be configured to receive the first resource indication message sent by the network device when the network device schedules the data channel through the plurality of control channels. The first resource indication message may include: a time slot offset of data, which is indicated in the plurality of control channels, to the PUCCH resource, and a resource indication of the PUCCH.

The processing module 201 may be configured to determine a feedback time slot of the PUCCH based on the resource of the data channel and the time slot offset of data, which is indicated in the plurality of control channels, to the PUCCH resource.

The processing module 201 may be configured to determine the PUCCH resource based on the resource indication of the PUCCH and the feedback time slot of the PUCCH.

Alternatively, the processing module 201 may be configured to determine the resource of the data channel based on the time slot where the first control channel is located and the resource allocation information of the data channel indicated by the first control channel.

Figure 8:
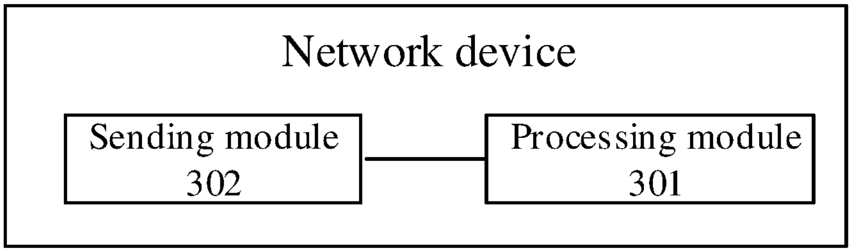
FIG. 8 is a structural schematic view of a network device according to an embodiment of the present disclosure.

As shown in FIG. 8, embodiments of the present disclosure provide a network device, including following components.

A processing module 301 may be configured to schedule the same data channel through a plurality of control channels.

The processing module 301 may be configured to determine the first control channel from the plurality of control channels, and determine the PUCCH resource carrying the HARQ feedback information of the data channel based on the first control channel.

Alternatively, the network device may further include following components.

A sending module 302 may be configured to in advance configure association relationships between the plurality of control channels for the terminal device, and the association relationships between the plurality of control channels may be configured to indicate that the plurality of control channels schedule the same data channel.

Alternatively, the first control channel may be a control channel of the plurality of control channels and designated from all control channels associated with the first identifier.

Alternatively, the first identifier may include: the largest identifier of all identifiers associated with the plurality of control channels or the smallest identifier of all identifiers associated with the plurality of control channels.

Alternatively, the first control channel may be the k-th control channel in an ordering result. The ordering result may be obtained by placing the candidate control channels based on the detection time points of the candidate control channels. The k may be an integer greater than or equal to 1.

The candidate control channels may be a plurality of control channels. Alternatively, the candidate control channels may be all control channels, which are associated with the first identifier and are part of the plurality of control channels.

Alternatively, the k-th control channel may include:

the first one of the control channels or the last one of the control channels.

Alternatively, when m control channels of all candidate control channels have a same detection time point, an order of the m control channels in the ordering result may be obtained by placing the m control channels in an order based on a second identifier associated with the m control channels. The m may be an integer greater than or equal to 2.

Alternatively, when n control channels of the m control channels correspond to a same second identifier, an order of the n control channels in the ordering result may be obtained by placing the n control channels in an order based on a third identifier associated with the n control channels. The n may be an integer greater than or equal to 2.

Alternatively, the first control channel may be a control channel, which is one of the candidate control channels and occupies a frequency-domain resource location of a specified size.

The candidate control channels may be a plurality of control channels. Alternatively, the candidate control channels may be all control channels, which are associated with the first identifier and are a part of the plurality of control channels.

Alternatively, the control channel occupying the frequency-domain resource location of the specified size may include following:

One of the candidate control channels that occupies a smallest frequency-domain resource location, or one of the candidate control channels that occupies a largest frequency-domain resource location.

Alternatively, the first identifier, the second identifier, and the third identifier may be determined by one of the following ways:

predetermined based on a standard; and configured by the network device.

Alternatively, the network device may further include following components.

A sending module 302 may be configured to indicate the first identifier, the second identifier, and the third identifier to the terminal device, by one of:

dynamically indicated by the network device; semi-statically indicated by the network device; and statically indicated by the network device.

Alternatively, the type of identifiers associated with the plurality of control channels may include:

at least one of the CORESET pool index; the CORESET ID; the TCI state ID; the search space ID; and the first CCE index.

Alternatively, the network device may further include the following components.

A sending module 302 may be configured to send the first resource indication message to the terminal device when network device is scheduling the data channel through the plurality of control channels. The first resource indication message may include: a time slot offset of data, which is indicated in the plurality of control channels, to the PUCCH resource, and a resource indication of the PUCCH.

Alternatively, the processing module 301 may be configured to determine the C-DAI of the data channel and the T-DAI of the data channel based on the receiving time point of the first control channel, the serving cell index corresponding to the first control channel, and the CORESET pool index.

Figure 9:
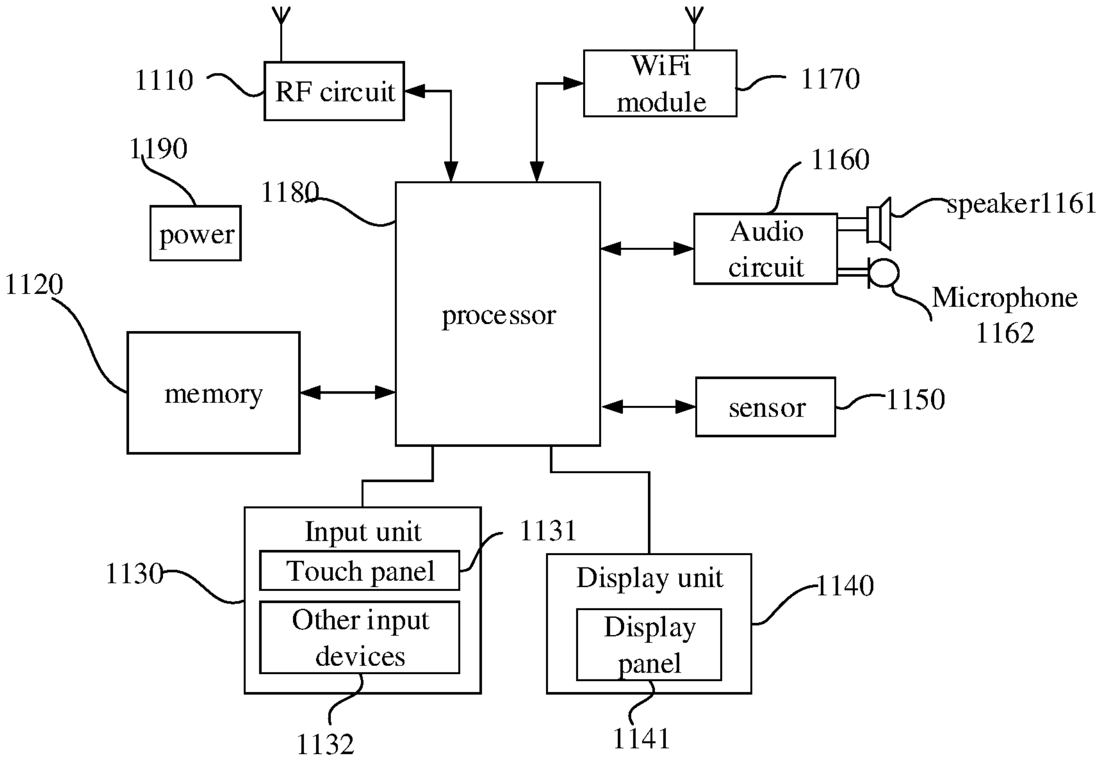
FIG. 9 is a structural schematic view of a mobile phone according to an embodiment of the present disclosure.

As shown in FIG. 9, the mobile phone may include: a radio frequency (RF) circuit 1110, a memory 1120, an input unit 1130, a display unit 1140, a sensor 1150, an audio circuit 1160, a wireless fidelity (WiFi) module 1170, a processor 1180, a power 1190, and so on. The RF circuit 1110 may include a receiver 1111 and a transmitter 1112. Any ordinary skilled person in the art shall understand that the structure of the mobile phone illustrated in FIG. 9 does not limit the mobile phone. The mobile phone may include more or fewer components than illustrated, or some components may be combined, or the components may be arranged in a different way.

The RF circuit 1110 may be configured to receive and send information, or during making phone calls, to receive and send signals. Specifically, after receiving downlink information from the base station, and the RF circuit 1110 may transfer the downlink information to the processor 1180 for processing. In addition, the RF circuit 1110 may send data for uplink to the base station. Usually, the RF circuit 1110 may include, but is not limited to, an antenna, at least one amplifier, a transceiver, a coupler, a low noise amplifier (LNA), a duplexer, and so on. In addition, the RF circuitry 1110 may also communicate with other devices through networks and wireless communication. The above wireless communication may apply any communication standard or protocol, including but not limited to a global system of mobile communication (GSM), a general packet radio service (GPRS), a code division multiple access (CDMA), a broadband division multiple access (CDMA), a wideband code division multiple access (WCDMA), long term evolution (LTE), an e-mail, a short messaging service (SMS), and so on.

The memory 1120 may be configured to store software programs and modules. The processor 1180 performs various functional applications and process data of the phone by running the software programs and the modules stored in the memory 1120. The memory 1120 may include a program storage area and a data storage area. The program storage area may store an operating system, an application required for at least one function (such as sound playing function, image display function, and so on), and so on. The data storage area may store data (such as audio data, contact list, and so on) created while the phone is being used. In addition, the memory 1120 may include a high-speed random access memory, a non-volatile memory, such as at least one disk memory component, a flash memory component, or other volatile solid state memory component.

The input unit 1130 may be configured to receive an input digit or character information and to generate a key signal input related to user settings and control of functions of the phone. Specifically, the input unit 1130 may include a touch panel 1131 and other input devices 1132. The touch panel 1131 may also be referred to as a touch screen and may collect touch operations (for example, the user may use a finger, a stylus, any suitable object or attachment to perform operations on or near the touch panel 1131) performed by the user on or near the touch panel. The touch panel 1131 may drive a corresponding connected apparatus based on a predetermined program. Alternatively, the touch panel 1131 may include: a touch detection device and a touch controller. The touch detection device detects a touch orientation of the user, detects a signal caused by the touch operation, and sends the signal to the touch controller. The touch controller receives touch information from the touch detection device, converts the touch information into contact coordinates, sends the contact coordinates to the processor 1180, and receives and execute commands sent from the processor 1180. In addition, the touch panel 1131 may be a resistive touch panel, a capacitive touch panel, an infrared touch panel, and a surface acoustic wave touch panel. In addition to the touch panel 1131, the input unit 1130 may further include other input devices 1132. Specifically, the other input devices 1132 may include, but are not limited to, one or more of: a physical keyboard, a function key (such as volume control buttons, a switch button, and so on), a trackball, a mouse, a joystick, and so on.

The display unit 1140 may be configured to display information entered by the user or provided for the user and various menus of the phone. The display unit 1140 may include a display panel 1141, and alternatively, the display panel 1141 may be configured in a form of a liquid crystal display (LCD), an organic light-emitting diode (OLED), and so on. Further, the touch panel 1131 may cover the display panel 1141. When the touch panel 1131 detects the touch operation on or near the touch panel, the touch operation is transmitted to the processor 1180 to determine a type of the touch operation. Subsequently, the processor 1180 provides a corresponding visual output on the display panel 1141 based on the type of touch operation. Although in FIG. 11, the touch panel 1131 and the display panel 1141 are configured as two separated components to implement the input of the phone and input functions of the phone, in some embodiments, the touch panel 1131 may be integrated with the display panel 1141 to implement the input and output functions of the phone.

The phone may further include at least one sensor 1150, such as a light sensor, a motion sensor, and other sensors. Specifically, the light sensor may include an ambient light sensor and a proximity light sensor. The ambient light sensor may adjust brightness of the display panel 1141 based on brightness of the ambient light. The proximity light sensor may turn off the display panel 1141 and/or a backlight when the phone is moved near an ear. As a type of motion sensor, the accelerometer sensor may detect a magnitude of acceleration in all directions (generally in three axes). A magnitude and a direction of the gravitational force may be detected when the phone is at rest. The accelerometer sensor may be used for applications that identify the phone's posture (such as horizontal and vertical display switching, related games, magnetometer posture calibration), vibration recognition-related functions (such as pedometer, tapping), and so on. The phone may further be configured with a gyroscope, a barometer, a hygrometer, a thermometer, an infrared sensor, and so on, which will not be described in detail herein.

The audio circuit 1160, a speaker 1161, and a microphone 1162 may provide an audio interface between the user and the mobile phone. The audio circuit 1160 may transmit electrical signals, which are converted from the received audio data, to the speaker 1161. The speaker 1161 may convert the electrical signals into sound signals for output. On the other hand, the microphone 1162 converts the collected sound signals into electrical signals. The audio circuit 1160 receives and converts the electrical signals into audio data, and transmits the audio data to the processor 1180. After the processor 1180 processes the audio data, the audio data may be sent via the RF circuit 1110 to another mobile phone. Alternatively, the audio data may be output to the memory 1120 for further processing.

WiFi is short-range wireless transmission. The mobile phone may facilitate the user to send and receive emails, browse websites and access streaming media, and so on, through the WiFi module 1170. The WiFi module 1170 provides wireless broadband Internet access for the user. Although FIG. 9 illustrates the WiFi module 1170, it shall be understood that the WiFi module 1170 may not be a mandatory component of the mobile phone and may be omitted entirely as needed, as long as the essence of the present disclosure is not changed.

The processor 1180 is a control center of the phone and connects various parts of the mobile phone by various interfaces and lines. The processor 1180 performs various functions and processes data of the phone by running or executing software programs and/or modules stored in the memory 1120 and by invoking data stored in the memory 1120, such that the processor 1180 performs overall monitoring on the phone. Alternatively, the processor 1180 may include one or more processing units. Preferably, the processor 1180 may integrate an application processor and a modem processor. The application processor may substantially process the operating system, the user interface, applications, and so on. The modem processor may substantially process wireless communications. It shall be understood that the modem processor may not be integrated into the processor 1180.

The phone further includes a power 1190 (such as a battery) to supply power for various components. Preferably, the power may be logically connected to the processor 1180 via a power management system, such that charging management, discharging management, and power consumption management may be performed through the power management system. Although not shown, the phone may further include a camera, a Bluetooth module, and so on, which will not be described herein.

In an embodiment of the present disclosure, the processor 1180 may be configured to determine a first control channel from a plurality of control channels scheduling the same data channel and to determine, based on the first control channel, at least one of the following information:

The PUCCH resource that carries the HARQ feedback information of the data channel; the location of the HARQ feedback information of the data channel in the HARQ code book; and the resource of the data channel.

Alternatively, the association relationships between the plurality of control channels are configured in advance by the network device, and the association relationships between the plurality of control channels may be configured to indicate that the plurality of control channels schedule the same data channel.

Alternatively, the processor 1180 may further be configured to detect the at least one control channel and to determine a plurality of control channels based on the association relationships between the at least one control channel and other control channels.

The plurality of control channels may include: at least one control channel and other control channels scheduling the same data channel as the at least one control channel.

Alternatively, the first control channel may be a control channel of the plurality of control channels and designated from all control channels associated with the first identifier.

Alternatively, the first identifier may include: the largest identifier of all identifiers associated with the plurality of control channels or the smallest identifier of all identifiers associated with the plurality of control channels.

Alternatively, the first control channel may be the k-th control channel in an ordering result. The ordering result may be obtained by placing the candidate control channels based on the detection time points of the candidate control channels. The k may be an integer greater than or equal to 1.

The candidate control channels may be a plurality of control channels. Alternatively, the candidate control channels may be all control channels, which are associated with the first identifier and are part of the plurality of control channels.

Alternatively, the k-th control channel may include:

the first one of the control channels or the last one of the control channels.

Alternatively, when m control channels of all candidate control channels have a same detection time point, an order of the m control channels in the ordering result may be obtained by placing the m control channels in an order based on a second identifier associated with the m control channels. The m may be an integer greater than or equal to 2.

Alternatively, when n control channels of the m control channels correspond to a same second identifier, an order of the n control channels in the ordering result may be obtained by placing the n control channels in an order based on a third identifier associated with the n control channels. The n may be an integer greater than or equal to 2.

Alternatively, the first control channel may be a control channel, which is one of the candidate control channels and occupies a frequency-domain resource location of a specified size.

The candidate control channels may be a plurality of control channels. Alternatively, the candidate control channels may be all control channels, which are associated with the first identifier and are a part of the plurality of control channels.

Alternatively, the control channel occupying the frequency-domain resource location of the specified size may include following:

One of the candidate control channels that occupies a smallest frequency-domain resource location, or one of the candidate control channels that occupies a largest frequency-domain resource location.

Alternatively, the first identifier, the second identifier, and the third identifier may be determined by one of the following ways:

predetermined based on a standard; dynamically indicated by the network device; semi-statically indicated by the network device; and statically indicated by the network device.

Alternatively, the identifiers associated with the plurality of control channels may include:

at least one of the CORESET pool index; the CORESET ID; the TCI state ID; the search space ID; and the first CCE index.

Alternatively, the processor 1180 may be configured to determine the C-DAI of the data channel and the T-DAI of the data channel based on the first control channel.

The processor 1180 may be configured to determine the location of the HARQ feedback information of the data channel in the HARQ code book based on the C-DAI of the data channel and the T-DAI of the data channel.

Alternatively, following components may further be included.

The RF circuit 1110 may be configured to receive the first resource indication message, which is sent by the network device when scheduling the data channel through the plurality of control channels. The first resource indication message may include: a time slot offset of data, which is indicated in the plurality of control channels, to the PUCCH resource, and a resource indication of the PUCCH.

The processor 1180 may further be configured to determine the feedback time slot of the PUCCH based on the resource of the data channel and the time slot offset of data, which is indicated in the plurality of control channels, to the PUCCH resource; and to determine the PUCCH resource based on the resource indication of the PUCCH and the feedback time slot of the PUCCH.

Alternatively, the processor 1180 may be configured to determine the resource of the data channel based on the time slot where the first control channel is located and the resource allocation information of the data channel indicated by the first control channel.

Figure 10:
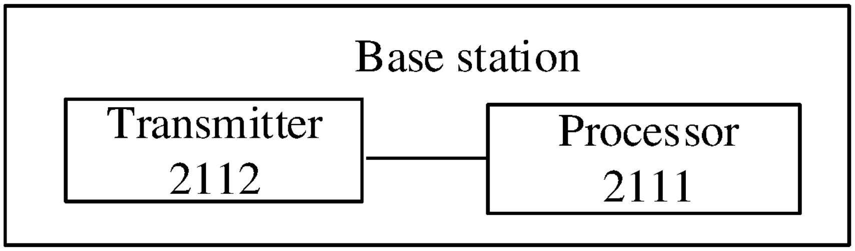
FIG. 10 is a structural schematic view of a base station according to an embodiment of the present disclosure.

Exemplarily, the network device of embodiments of the present disclosure may be a base station, as shown in FIG. 10. The base station may include following components.

A processor 2110 may be configured to schedule the same data channel through a plurality of control channels.

The processor 2110 may be configured to determine the first control channel from the plurality of control channels, and determine the PUCCH resource carrying the HARQ feedback information of the data channel based on the first control channel.

Alternatively, the based station may further include following components.

A transmitter 2112 may be configured to configure in advance association relationships between the plurality of control channels for the terminal device, and the association relationships between the plurality of control channels may be configured to indicate that the plurality of control channels schedule the same data channel.

Alternatively, the first control channel may be a control channel of the plurality of control channels and designated from all control channels associated with the first identifier.

Alternatively, the first identifier may include: the largest identifier of all identifiers associated with the plurality of control channels or the smallest identifier of all identifiers associated with the plurality of control channels.

Alternatively, the first control channel may be the k-th control channel in an ordering result. The ordering result may be obtained by placing the candidate control channels based on the detection time points of the candidate control channels. The k may be an integer greater than or equal to 1.

The candidate control channels may be a plurality of control channels. Alternatively, the candidate control channels may be all control channels, which are associated with the first identifier and are part of the plurality of control channels.

Alternatively, the k-th control channel may include:

the first one of the control channels or the last one of the control channels.

Alternatively, when m control channels of all candidate control channels have a same detection time point, an order of the m control channels in the ordering result may be obtained by placing the m control channels in an order based on a second identifier associated with the m control channels. The m may be an integer greater than or equal to 2.

Alternatively, when n control channels of the m control channels correspond to a same second identifier, an order of the n control channels in the ordering result may be obtained by placing the n control channels in an order based on a third identifier associated with the n control channels. The n may be an integer greater than or equal to 2.

Alternatively, the first control channel may be a control channel, which is one of the candidate control channels and occupies a frequency-domain resource location of a specified size.

The candidate control channels may be a plurality of control channels. Alternatively, the candidate control channels may be all control channels, which are associated with the first identifier and are a part of the plurality of control channels.

Alternatively, the control channel occupying the frequency-domain resource location of the specified size may include following:

One of the candidate control channels that occupies a smallest frequency-domain resource location, or one of the candidate control channels that occupies a largest frequency-domain resource location.

Alternatively, the first identifier, the second identifier, and the third identifier may be determined by one of the following ways:

predetermined based on a standard; and configured by the network device.

Alternatively, the base station may further include following components.

The transmitter 2112 may be configured to indicate the first identifier, the second identifier, and the third identifier to the terminal device, by one of:

dynamically indicated by the network device; semi-statically indicated by the network device; and statically indicated by the network device.

Alternatively, the type of identifiers associated with the plurality of control channels may include:

at least one of the CORESET pool index; the CORESET ID; the TCI state ID; the search space ID; and the first CCE index.

Alternatively, the base station may further include the following components.

The transmitter 2112 may be configured to send the first resource indication message to the terminal device when network device is scheduling the data channel through the plurality of control channels. The first resource indication message may include: a time slot offset of data, which is indicated in the plurality of control channels, to the PUCCH resource, and a resource indication of the PUCCH.

Alternatively, the processor 2110 may be configured to determine the C-DAI of the data channel and the T-DAI of the data channel based on the receiving time point of the first control channel, the serving cell index corresponding to the first control channel, and the CORESET pool index.

The terminal device and the network device provided by the embodiments of the present disclosure may implement the communication method in the method embodiments and achieve a same technical effect. Description of the technical effect for the terminal device and the network device may be referred to the corresponding description in the method embodiments and will not be repeated here.

Embodiments of the present disclosure further provide a computer readable storage medium including computer instructions. When the computer instructions are run on a computer, the computer may be caused to perform various processes of the terminal device in the method embodiments described above.

Embodiments of the present disclosure further provide a computer readable storage medium including computer instructions. When the computer instructions are run on a computer, the computer may be caused to perform various processes of the network device in the method embodiments described above.

Embodiments of the present disclosure further provide a computer program product including computer instructions. When the computer program product is run on a computer, the computer may be caused to execute computer instructions such that the computer performs the various processes of the terminal device in the method embodiments described above.

Embodiments of the present disclosure further provide a computer program product including computer instructions. When the computer program product is run on a computer, the computer executes the computer instructions such that the computer performs various processes of the network device in the method embodiments described above.

Embodiments of the present disclosure further provide a chip, the chip is coupled with a memory in the terminal device, such that when the chip is running, the chip invokes program instructions stored in the memory, causing the terminal device to perform various processes of the terminal device in the method embodiments described above.

Embodiments of the present disclosure further provide a chip. The chip is coupled with a memory in the network device, such that when the chip is running, the chip invokes program instructions stored in the memory, causing the network device to perform various processes of the network device in the method embodiments described above.

The above embodiments may be implemented as a whole or in part by software, hardware, firmware, or any combination thereof. When implemented by software, the entire or a part of the embodiments may be implemented in a form of a computer program product. The computer program product includes one or more computer instructions. When the computer instructions are loaded and executed on a computer, all or a part of the processes or functions of the embodiments of the present disclosure may be generated. The computer may be a general purpose computer, a specialized computer, a computer network, or other programmable device. The computer instructions may be stored in a computer readable storage medium or transmitted from one computer readable storage medium to another computer readable storage medium. For example, the computer instructions may be transmitted from one website site, one computer, one server, or one data center to another website, another computer, another server, or another data center, via wired transmission (such as via a coaxial cable, fiber optic, a digital subscriber line (DSL)) or wireless transmission (such as infrared, wireless, microwave, and so on). The computer readable storage medium may be any available medium that is stored in a computer or a server including integration of one or more available media, a data center, and other data storage devices. The available medium can be a magnetic medium (such as a floppy disk, a hard disk, a tape), an optical medium (such as DVDs), or a semiconductor medium (such as a Solid State Disk (SSD)), and so on.

The expressions “first”, “second”, “third”, “fourth”, and so on (if present) in the specification, claims and the accompanying drawings of the present disclosure are used to distinguish similar objects and are not used to describe a particular order or sequence. It shall be understood that the data described in this way may be interchangeable when appropriate, such that the embodiments described herein may be implemented in an order other than the order illustrated or described herein. In addition, the expressions “including”, “having”, and any variations thereof, are intended to cover non-exclusive inclusion. For example, a process, a method, a system, a product, or an apparatus including a series of operations or units is not limited to the operations or units that are clearly listed, and may include operations or units that are not clearly listed or are inherent to the process, the method, the product, or the device.

What is claimed is:

1. A communication method, comprising:

configuring, by a network device, in advance association relationships between a plurality of control channels to a terminal device, wherein the association relationships between the plurality of control channels are configured to indicate that the plurality of control channels schedule a same data channel;

receiving, by the terminal device, the association relationships;

determining one first control channel from the plurality of control channels scheduling the same data channel; and determining, based on the first control channel, a physical uplink control channel (PUCCH) resource that carries a hybrid automatic repeat request (HARQ) feedback information of the data channel, wherein the first control channel is a control channel of the plurality of control channels and designated from all control channels associated with a smallest identifier of all identifiers associated with the plurality of control channels, wherein types of identifiers associated with the plurality of control channels comprise at least one of: a control resource set (CORESET) ID and a search space ID, wherein before the determining, based on the first control channel, the PUCCH resource that carries the HARQ feedback information of the data channel, the communication method further comprises:

receiving, by the terminal device, a first resource indication message sent by the network device when the network device schedules the data channel through the plurality of control channels, wherein the first resource indication message comprises: a time slot offset of data, which is indicated in the first control channel, to the PUCCH resource, and a resource indication of the PUCCH;

wherein the determining, based on the first control channel, the PUCCH resource that carries the HARQ feedback information of the data channel comprises:

determining, by the terminal device, a feedback time slot of the PUCCH based on a resource of the data channel and the time slot offset of data, which is indicated in the first control channel, to the PUCCH resource; and determining, by the terminal device, a PUCCH resource based on the resource indication of the PUCCH and the feedback time slot of the PUCCH, wherein the first control channel is k-th control channel in an ordering result, the ordering result is obtained by placing candidate control channels based on detection time points of the candidate control channels, and k is an integer greater than or equal to 1; and the candidate control channels are all control channels, which are associated with a first identifier and are part of the plurality of control channels, wherein the first identifier is the smallest identifier of all identifiers associated with the plurality of control channels.

2. A terminal device, comprising: a processor and a receiver, wherein, the receiver is configured to receive association relationships between a plurality of control channels configured by a network device, wherein the association relationships between the plurality of control channels are configured to indicate that the plurality of control channels schedule a same data channel;

the processor is configured to determine a first control channel from the plurality of control channels scheduling the same data channel;

the processor is configured to determine, based on the first control channel, a physical uplink control channel (PUCCH) resource that carries a hybrid automatic repeat request (HARQ) feedback information of the data channel, wherein the first control channel is a control channel of the plurality of control channels and designated from all control channels associated with a smallest identifier of all identifiers associated with the plurality of control channels, wherein types of identifiers associated with the plurality of control channels comprise at least one of: a control resource set (CORESET) ID and a search space ID, wherein the receiver is further configured to:

receive a first resource indication message sent by the network device when the network device schedules the data channel through the plurality of control channels, wherein the first resource indication message comprises: a time slot offset of data, which is indicated in the first control channel, to the PUCCH resource, and a resource indication of the PUCCH;

wherein the processor is further configured to:

determine a feedback time slot of the PUCCH based on the resource of the data channel and the time slot offset of data, which is indicated in the first control channel, to the PUCCH resource; and determine a PUCCH resource based on the resource indication of the PUCCH and the feedback time slot of the PUCCH, wherein the first control channel is k-th control channel in an ordering result, the ordering result is obtained by placing candidate control channels based on detection time points of the candidate control channels, and k is an integer greater than or equal to 1; and the candidate control channels are all control channels, which are associated with a first identifier and are part of the plurality of control channels, wherein the first identifier is the smallest identifier of all identifiers associated with the plurality of control channels.

3. The terminal device according to claim 2, wherein, the processor is further configured to detect at least one control channel and determine the plurality of control channels based on the association relationships between the at least one control channel and other control channels; and the plurality of control channels comprise: the at least one control channel and other control channels scheduling the same data channel as the at least one control channel.

4. The terminal device according to claim 2, wherein a first identifier is determined by one of: predetermined based on a standard; dynamically indicated by the network device; semi-statically indicated by the network device; or statically indicated by the network device.

5. The terminal device according to claim 2, wherein the processor is configured to:

determine a counter downlink allocation index (C-DAI) of the data channel and a total downlink allocation index (T-DAI) of the data channel based on the first control channel; or determine a location of the HARQ feedback information of the data channel in a HARQ code book based on the C-DAI of the data channel and the T-DAI of the data channel.

6. The terminal device according to claim 2, wherein when m control channels of the all candidate control channels have a same detection time point, an order of the m control channels in the ordering result is obtained by placing the m control channels in an order based on second identifiers associated with the m control channels, and m is an integer greater than or equal to 2, and wherein when n control channels of the m control channels correspond to a same second identifier, an order of the n control channels in the ordering result is obtained by placing the n control channels in an order based on third identifiers associated with the n control channels, and n is an integer greater than or equal to 2.

7. A network device, comprising a processor and a transmitter, wherein the processor is configured to:

configure association relationships between a plurality of control channels to a terminal device, wherein the association relationships between the plurality of control channels are configured to indicate that the plurality of control channels schedule a same data channel;

determine one first control channel from the plurality of control channels, and determine, based on the first control channel, a PUCCH resource carrying HARQ feedback information of the data channel, wherein the first control channel is a control channel of the plurality of control channels and designated from all control channels associated with a smallest identifier of all identifiers associated with the plurality of control channels, wherein types of identifiers associated with the plurality of control channels comprise at least one of: a control resource set (CORESET) ID and a search space ID, wherein the transmitter is further configured to send a first resource indication message to the terminal device when network device is scheduling the data channel through the plurality of control channels, and the first resource indication message comprises: a time slot offset of data, which is indicated in the first control channel, to the PUCCH resource, and a resource indication of the PUCCH, wherein the time slot offset of data, which is indicated in the first control channel, to the PUCCH resource and a resource of the data channel are used for the terminal device to determine a feedback time slot of the PUCCH, and the feedback time slot of the PUCCH and the resource indication of the PUCCH are used for the terminal device to determine a PUCCH resource, wherein the first control channel is k-th control channel in an ordering result, the ordering result is obtained by placing candidate control channels based on detection time points of the candidate control channels, and k is an integer greater than or equal to 1; and the candidate control channels are all control channels, which are associated with a first identifier and are part of the plurality of control channels, wherein the first identifier is the smallest identifier of all identifiers associated with the plurality of control channels.

8. The network device according to claim 7, wherein a first identifier is determined by one of:

predetermined based on a standard; or configured by the network device.

9. The network device according to claim 7, wherein the transmitter is further configured to indicate a first identifier, a second identifier, and a third identifier to a terminal device by one of following ways:

dynamically indicated by the network device; semi-statically indicated by the network device; and statically indicated by the network device.

10. The network device according to claim 7, wherein the processor is further configured to determine a counter downlink allocation index (C-DAI) of the data channel and a total downlink allocation index (T-DAI) of the data channel based on a receiving time point of the first control channel, a serving cell index corresponding to the first control channel, and a CORESET pool index.

11. The network device according to claim 7, wherein when m control channels of the all candidate control channels have a same detection time point, an order of the m control channels in the ordering result is obtained by placing the m control channels in an order based on second identifiers associated with the m control channels, and m is an integer greater than or equal to 2.

12. The network device according to claim 11, wherein when n control channels of the m control channels correspond to a same second identifier, an order of the n control channels in the ordering result is obtained by placing the n control channels in an order based on third identifiers associated with the n control channels, and n is an integer greater than or equal to 2.

* * * * *